J. G. DUNHAM.
Mower.
No. 30,961.
2 Sheets—Sheet 1.
Patented Dec. 18, 1860.
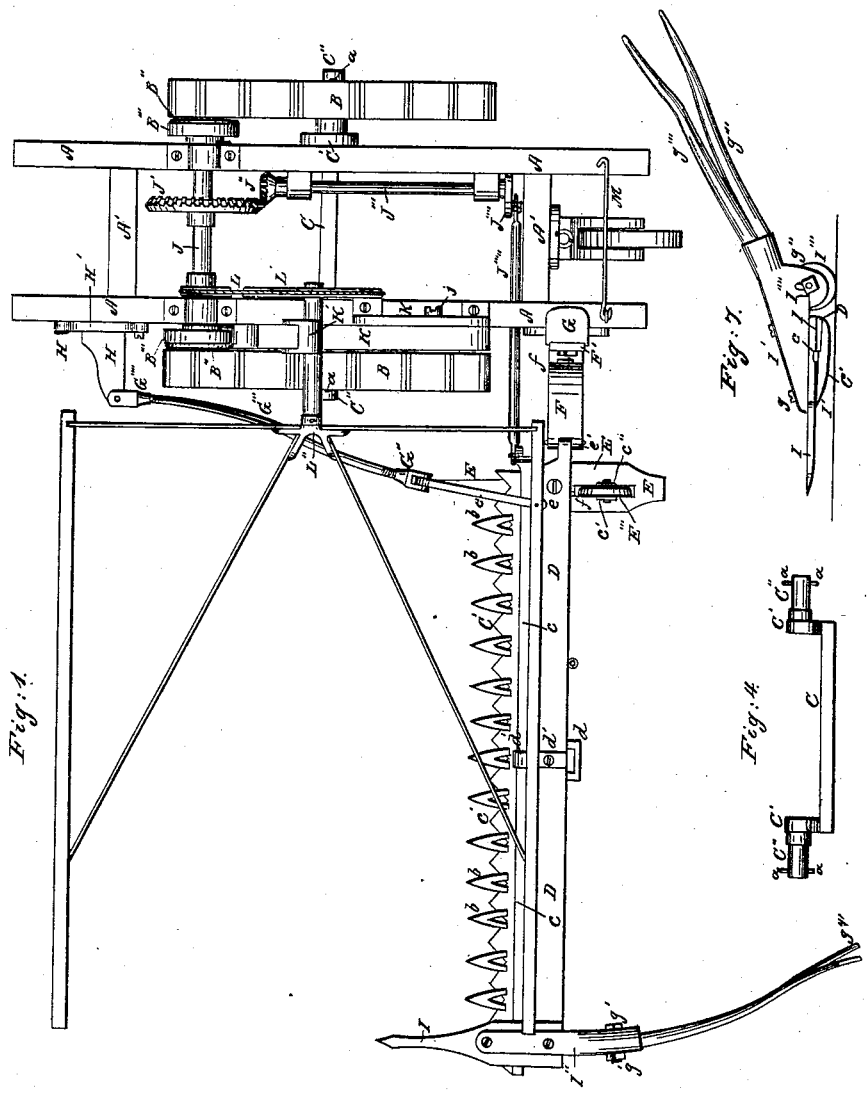

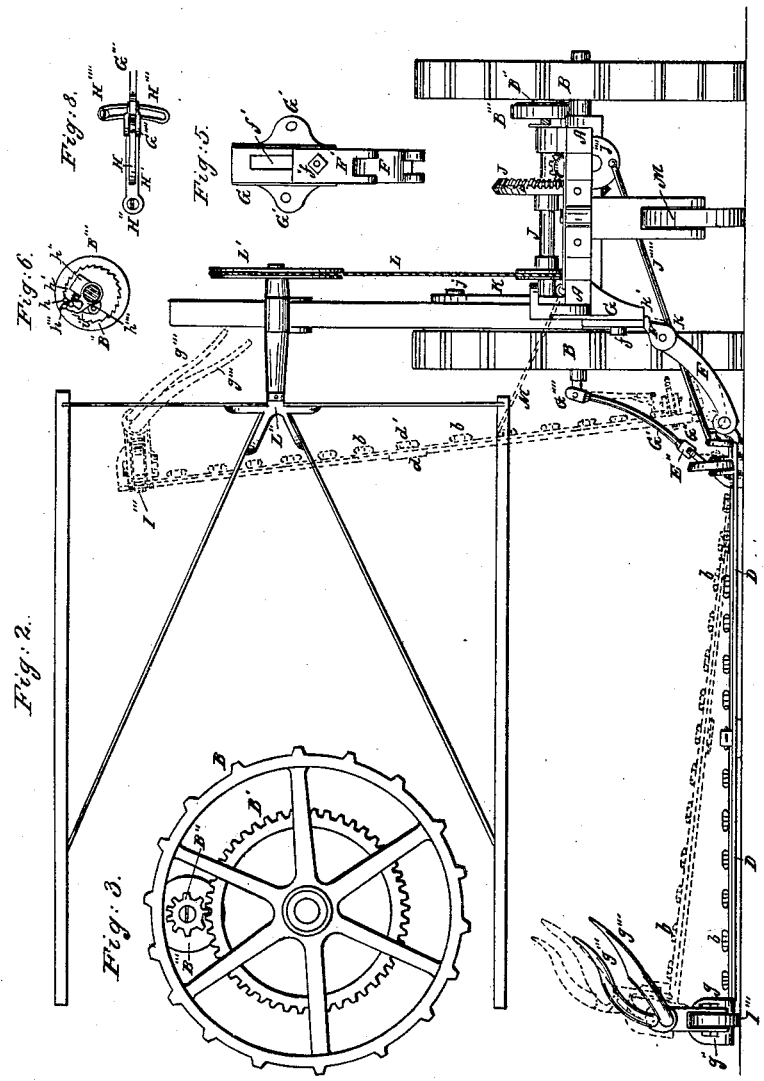

UNITED STATES PATENT OFFICE.

JOHN G. DUNHAM, OF RARITAN, NEW JERSEY.

IMPROVEMENT IN MOWING-MACHINES.

Specification forming part of Letters Patent No. 30,961, dated December 18, 1860.

*To all whom it may concern:*

Be it known that I, JOHN G. DUNHAM, of Raritan, in the county of Somerset, in the State of New Jersey, have invented certain new and useful Improvements in Mowing-Machines; and I do hereby declare that the following is a full, clear, and exact description thereof, reference being had to the accompanying drawings, which form a part of this specification, in which—

Figure 1 represents a top or plan view of my machine. Fig. 2 represents a rear view of my machine, the finger-beam which supports the cutting apparatus being shown in black lines in the position which it occupies when the machine is drawn over the level ground, and in red dotted lines in the position which it occupies when the outer end thereof is raised up by some elevation in the ground in the path of the outer end of the cutting apparatus, while the red full lines represent the finger-beam and cutting apparatus raised or folded up at the side of the machine to enable it to be moved from one field to another. Fig. 3 represents a side view of one of the main driving-wheels, together with its main gear, the wheel being detached. Fig. 4 represents a rear view of the stationary axle or journal which supports the main frame. Fig. 5 represents the parts by which the heel of the finger-beam is attached to the main frame, and by which the heel of the finger-beam can be adjusted so as to be higher or lower. Figs. 6, 7, and 8 represent detached parts which will be referred to hereinafter.

A A A' A' represent the main frame, which is fastened to the part C' C' of the axle or stationary journal C. In this instance the side pieces, A A, rest on the stationary journal or axle C, just inside of the parts C' C', and to which they are fastened by screws or bolts passing through the side pieces, A A, into the parts C' C'. By constructing the journal C in the form shown, the frame can be set so as to be on a line with the axes of the wheels B B', which run or turn on the journals C'' C''. Another advantage resulting therefrom is also due to the fact that the boxes are dispensed with, which are necessary when a rotating shaft is used. Again, the frame A A A' A' is more firmly supported, since it is strongly supported by the parts C' C' against lateral twisting. Again, with a journal or axle constructed as shown in Fig. 4, the frame can be set at any desired distance either above or below the axis of the wheels, since by making the bends or knees C' C' longer the frame can be dropped down or raised up by putting under or taking out blocking, which may be placed between the frame and the stationary journal C. In turning the machine, especially on soft ground, its tendency to twist is very great, but which is prevented by my mode of attaching the frame to the part C. The wheels B B' are kept on their journals by pins $a$ $a$.

The finger-beam D is made of metal, and is securely fastened at its heel or inner end to the inner shoe, E, which is formed with a wide rear part, E'', in which is an opening for a conical wheel, E''', the journal of which rests in upwardly-projecting ears $e''$ $e''$, cast with the shoe E. The front of the shoe E is recessed down, so that the finger-beam has a firm shoulder, $f''$, against which to abut, while the front of the shoe is narrowed as it projects forward, and terminates by being hinged to the wrist G'', into which screws one end of the truss-rod G''', while the other end screws into a wrist, G'''', hinged to projection H on the side of the piece H', fulcrumed or pivoted at H'' to the inside of the front of the main frame, whereby the part H' can be turned on H'' as a center, and then held in such new position by simply unscrewing screw H'''', which passes through the slot or opening H''' in H' and then into the side of the main frame A. A rear projecting piece, $e$, extends back from the front shoe, E, and under which works the cutter-bar $c$ and cutters $c'$, the under side of the projection $e$ being recessed out, so as to permit the cutter-bar to fit up into it, whereby the cutters are prevented from sliding forward against the front of the fingers. The rear end of the projection $e$ also rests on the upper side of the finger-beam, and thus tends to keep that steady.

The fingers $b$ and cutters $c'$ may be of any desirable form. The rear ends of the fingers $b$ are attached to the under side of the finger-beam D. A small shoe, $d$, is attached to the under side of the finger-beam, and near the center of its length, for the purpose of relieving the bottom of the fingers from friction on the ground, and also to support the center of the finger-beam on a line with the ends thereof. The cutter-bar works under a guidepiece, $d'$, attached by a screw to the middle of the upper side of the finger-beam, as shown in Fig. 1.

To the outer end of the finger-beam is attached a shoe, I, the under side of which is recessed out a little, so as to keep it properly in place. A small runner, I', is fastened to the under side of the finger-beam D, and also to the under side of the shoe I, in front of the point of the cutters $c'$. This runner I' serves to support the outer end of the cutter-bar and cutter.

To the upper side of the outer end of the finger-beam is attached a cap-piece, I'', which is fastened to the top of the shoe I and finger-beam D by screws $g\ g$. The under side of the cap-piece I'' is cast with a groove for two reasons: first, it makes it lighter, and, second, it affords the requisite protection and space for the play of the conical wheel I''', whose journal I'''' is supported in the sides of the cap-piece I, which has openings, so that the journal of the wheel I''' can be set up or down, and thus enable the finger-beam and cutter to be adjusted to cut the grass at different heights from the ground. The journal of wheel I''' is provided with a head, $g'$, and a nut, $g''$, whereby it can be held in different positions in the openings in the sides of the cap-piece I''. The rear of the cap-piece I'' has two parallel sockets for the reception of clearing-arms $g'''\ g'''$, which turn the grass, after it has been cut, inwardly, so as to leave a clear space next to the standing grass.

From that side of shoe E next the main frame projects an ear, $e'$, which is pivoted or hinged between lugs cast on the curved piece F, while the other end of F is hinged to the adjusting-piece F', which fits into a recess cast in the face of piece G, which is rigidly secured to the side of the frame by screws or bolts passing through its ears G' G'.

The heel of the finger-beam can be lowered or raised and held in different relative positions as respects the ground by unscrewing nut $f$ and sliding its bolt $i$ up or down in groove $f'$ in the piece G and then tightening up the nut $f$ again. Motion is communicated to the cutter $c'$ from the gear J' on shaft J through small gear J'' on shaft J''', to the lower end of which is attached a crank-wheel, J'''', which operates the pitman J''''', connected to the cutter-bar $c$.

On each end of the shaft J turns loosely a small gear, B'', the edges of which are seen in Fig. 1, the remainder of the gears being hid by the periphery of the wheels B, and to which are attached cases B''', one to each gear. The cases B''' are closed on their sides next to the gears, but are open on their opposite sides, as shown in Fig. 6, where $h$ represents a pawl which fits into ratchet-teeth $h'$ in the case B'''. The pawl $h$ is pivoted at $h''''$ to lugs on the piece $h''$, which is fastened to shaft J. The front of the pawl $h$ rests on a coiled spring inserted in a hole in the piece $h''$, whereby the pawl is forced up in contact with the ratchet-teeth $h'$. It will thus be seen that when the machine is backed the teeth $h'$ will slip over the pawl, but will be prevented when the machine is moved forward. To throw the pawl $h$ out of action when the machine is to be moved from one field to another, the point of the piece $h'''$, which turns loosely on shaft J, is depressed so as to bring the pin which projects from the side of pawl $h$ through an opening in the piece $h'''$ down into the curve or recess $i$, where it is retained by the peculiar construction of the piece $h'''$, and consequently the end of the pawl $h$ is depressed so low as not to catch in the teeth $h'$.

Fig. 3 represents one of the wheels B, with its gear B', which is fastened to its arms, and from which power is communicated to shaft J when the wheel is in place on the machine, the gears B'' on shaft J working in gear with the gears B', an illustration of which is shown in the drawings. The gears B'' are held on by screws which work into the ends of shaft J.

To the inner rear upper side of the main frame A is attached a standard-piece, K, to which is hinged the reel-bearer K', having a sliding piece, K''. The piece K'' can be set up or down on the standard K, and there held by means of a set-screw on the under side. The standard K can also be set in different positions by means of screw $j$, which works in a groove in standard K. By these two adjustments it will be seen that the reel can be set either back or forward, and also up or down. Motion is communicated to the reel from a pulley on shaft J by band L, which passes around pulley L on the end of the reel-shaft, which passes through the sliding piece K''.

The form of the reel is fully shown in the drawings, being represented in a horizontal position in Fig. 1 and in a vertical position in Fig. 2. It is supported entirely from the end of the reel-shaft, which passes through the piece K'', and to which is attached the reel-hub or brace L''. The reel is a "knife-reel"— that is, it has but two arms which are parallel to each other. It is important, under certain circumstances, to use a reel with a mowing-machine—as, for instance, when descending inclined ground and the wind is blowing in the same direction in which the team is moving the grass is liable to blow down, so that the cutters will not catch it, or, if they do, at some distance from the roots. By the use of a reel, however, the grass is brought back and held to the cutters, so that whether the grass is lodged or blown forward it is sure to be cut, and that, too, in an even manner. A reel also assists to keep the grass from piling upon the finger-beam. Reels have not heretofore been combined with that class of mowing-machines to which mine belongs—viz., those using a folding finger-beam, so as to be unobjectionable, in that the reel had to be set forward before the finger-beam could be folded up, and then back again when the machine was to be used, thus consuming much time.

By combining a knife-reel as above described with a mowing-machine having a folding finger-beam, the cutting apparatus can be folded up at any time by simply turning the reel into a vertical position, as shown in Fig. 2. The motion of the reel can be stopped by throwing off the band L, or by unscrewing the set-screw which holds its drive-pulley to the shaft J.

The hinge piece F allows the finger-beam to rise bodily, or at either end, and that, too, independently of the up-and-down motion of the main frame, which is supported upon the main wheels B B and the caster-wheel M, attached to the rear of the main frame, and on a line, or nearly so, with the conical wheels $E'''$ and $I'''$. The machine is to be drawn by a tongue hinged to the front of the machine.

In backing the machine, so as to force the finger-beam and cutting apparatus out of the grass and toward the ground passed over by the main frame, no difficulty is experienced, since the wheels $E'''$ and $I'''$, being beveled off on the side next to the main frame slide over the ground, instead of cutting and shoving it before them.

The heel of the finger-beam is kept from falling too low down or from swinging under the rear of the frame in consequence of the projection $k$ on the under side of piece F coming in contact with shoulder $k'$ on the piece $F'$. When the finger-beam is raised up, as shown in full red lines in Fig. 2, it is held in that position by a hook-piece, M'. In the folding up of the finger-beam the truss-rod $G'''$ is somewhat sprung, and consequently has a tendency to keep up the piece F, as shown in red lines, Fig. 2. The piece $k$ may be cast with the piece F, or it may be formed by fastening on a piece of metal. In some cases it may be found convenient to make it of spring-steel. In either case it will prevent the heel of the finger-beam from falling below a certain point.

Having described my improved mowing-machine, what I claim as my invention, and desire to secure by Letters Patent, is—

1. The combination of a finger-beam, D, or its equivalent, with the hinged piece F, its projection $k$, adjustable piece F', and its shoulder $k'$, for the purposes set forth.

2. The combination of shoe E, truss-rod $G'''$, and piece H with finger-beam D and parts F, F', and G, arranged in relation to each other and the main frame substantially as shown and described.

3. In a mowing-machine, the combination of the following elements, namely: a main frame, two independent driving and supporting wheels, a caster-wheel, a hinged folding finger-beam, and a knife-reel, said parts being arranged in relation to each other and operating substantially as described.

4. The mechanism for throwing the cutter out of action, substantially as described, and as shown in Fig. 6.

5. The combination, with the main frame and supporting-wheels, of a stationary metallic axle or journal-piece, constructed substantially as described, and as shown in Figs. 1 and 4, for the purposes set forth.

6. The combination, with the main frame of a mowing-machine, of a knife-reel and a hinged folding finger-beam.

In witness whereof I have hereunto signed my name.

JOHN G. DUNHAM.

Witnesses:
EDWARD H. SMITH,
PETER V. STAATZ.